United States Patent Office 3,131,075
Patented Apr. 28, 1964

3,131,075
LOW DENSITY CEMENTING COMPOSITION
Fred A. Brooks, Jr., Houston, Tex., assignor, by mesne assignments, to Jersey Production Research Company, Tulsa, Okla., a corporation of Delaware
No Drawing. Filed Apr. 25, 1960, Ser. No. 24,224
10 Claims. (Cl. 106—90)

The present invention is directed to a low density, high early strength cementing composition. More particularly, the invention is concerned with a composition suitable for use in cementing oil wells. In its more specific aspects, the invention is concerned with a cementing composition which has high early strength and a low density.

Attempts have been made in recent years to develop low-density cement slurries for the primary cementing of the casing of oil and gas wells. The primary advantage of the low-density slurry of this application is the development of low hydrostatic heads by long strings of cement. This results in easy placement of cement at low-pump pressures and prevents uncontrolled fracturing of formations due to high-pump pressures which ordinarily have been employed.

A need exists for a cementing slurry having a low density within the range from about 10 pounds per gallon to about 12 pounds per gallon with acceptable set properties and at reasonable costs.

It has now been discovered that a superior low-density cement slurry may be obtained by mixing with the hydraulic cement a small percentage of a solid colloidal amorphous silica and by the emulsifying of a hydrocarbon oil in the continuous external water phase. Thus, the present invention is concerned with a low-density, high early strength cementing composition which comprises an oil-in-water emulsion, colloidal amorphous silica having a particle size within the range from about 0.005 to about 0.025 micron, and cement, the colloidal amorphous silica being present in an amount from about 1 to about 3 grams per one hundred grams of the cement.

The colloidal amorphous silica employed in the present invention is a colloidal amorphous silica of high purity. The chemical and physical properties of the colloidal amorphous silica are set out in Table I.

TABLE I

| | |
|---|---|
| Silica content (moisture-free basis) | 97 to 99.7%. |
| Free moisture (105° C.) | 0.2 to 2.0%. |
| Ignition loss (1000° C.) | 0.2–1.0% (excluding moisture 3.0% max.). |
| Calcium oxide, magnesium oxide | 0.00%. |
| $Fe_2O_3$ plus $Al_2O_3$ | 0.01%. |
| Particle size range | 0.005 to 0.25 microns. |
| Surface area (nitrogen absorption) | 175–300 square meters per gram. |
| Specific gravity | 2.1 to 2.2. |
| Color | White. |
| Refractive index | 1.55. |
| pH (4% aqueous dispersion) | 3.5–4.2. |
| Bulking value | 0.057 gallon per pound. |
| Apparent bulk density | 2.5–7 pounds per cubic foot. |

From the foregoing Table I, it will be seen that the colloidal amorphous silica is a high-purity silaca having a low iron content.

The oil employed in the practice of the present invention is suitably a hydrocarbon oil having a specific gravity within the range from about 0.65 to about 0.95. An acceptable specific gravity is about 0.8. Oils having this specific gravity may be exemplified by kerosene, gas oil, jet fuel, diesel fuel and other high boiling fractions. Exemplary of an oil suitable in the practice of the present invention may be mentioned diesel oil. Usually the oils employed in the practice of the present invention will boil within the range from about 160° to about 600° F. and have a viscosity of 1.5 to about 40 centipoises at 100° F.

The cement employed in the practice of the present invention is preferably Portland cement, although other cements may be used, such as "aluminous" cement and other hydraulic types of cements. Hydraulic cements identified in API STD 10A (Seventh Edition) as Class A, Class B, or Class C may suitably be used in the practice of this invention.

In practicing the present invention, it is preferable to employ an emulsifying agent in oil-in-water emulsion. Suitable emulsifying agents may be of the anionic and nonionic type. Illustrative of the emulsifying agents may be mentioned the water-soluble salts of lignin sulfonic acid such as calcium lignosulfonate. Nacconol SX may be used in this composition; this agent is an alkyl aryl sulfonate. These are anionic emulsifying agents. Nonionic agents which may be used include the emulsifying agent known to the trade as Renex–30, a polyoxyethylene alkyl ether and OPE–30, an octyl phenol 30 ethylene oxide. Other emulsifying agents may be used such as OPE–3, which is octyl phenol 3 ethylene oxide, and triton X–100, which is isooctyl phenyl polyethoxy ethanol. Other emulsifying agents may be used such as those disclosed in U.S. Patent 2,801,931.

In order to illustrate the compositions of the present invention, reference may be had to Table II, which follows, in which the range of concentrations of the various components of the present composition are given.

TABLE II

| | | |
|---|---|---|
| Colloidal silica | grams | 1 to 3 |
| Cement | do | 100 |
| Water | ml | 95 to 110 |
| Oil | ml | 50 to 65 |
| Emulsifying agent | | 0.5–5.0 |

It is preferred to use about 2 grams of the colloidal amorphours silica for every 100 grams of the cement which is preferably Portland cement. Best results are also obtained with about 100 milliliters of water for 100 grams of cement and about 50 to 65 milliliters of kerosene for 100 grams of cement, which produces a low-density cementing composition which has a high one-day compressive strength.

In order to illustrate the invention further, a number of compositions were made up in accordance with the practice of the present invention which were compared with another composition.

TABLE III

*Compressive Strength of Low Density Cement Slurries Cured According to API Schedule 3S*

| Slurry | Components | | | | Density, lbs./gal. | One-Day Compressive Strength, p.s.i. |
|---|---|---|---|---|---|---|
| | ml. H₂O/ 100 g. cement | ml. kerosene/ 100 g. cement | g. solid add./ 100 g. cement | g. solid additive/ 100 g. cement | | |
| 1 | 100 | 50 | 2 Cab-O-Sil¹ | 0.25 calcium lignosulphonate. | 11.0 | 366 |
| 2 | 100 | 55 | do | do | 10.8 | 301 |
| 3 | 100 | 60 | do | do | 10.7 | 342 |
| 4 | 105 | 50 | do | do | 10.95 | 296 |
| 5 | 105 | 55 | do | do | 10.8 | 293 |
| 6 | 105 | 60 | do | do | 10.6 | 289 |
| 7 | 110 | 50 | do | do | 10.7 | 270 |
| 8 | 110 | 55 | do | do | 10.7 | 276 |
| 9 | 110 | 60 | do | do | 10.6 | 264 |
| 10 | 100 | 55 | 0.5 Cab-O-Sil | do | 10.85 | 124 |
| 11 | 100 | 55 | 1 Cab-O-Sil¹ | do | 10.85 | 177 |
| 12 | 105 | 55 | 1 Cab-O-Sil | do | 10.8 | 181 |
| 13 | 105 | 50 | 3 Cab-O-Sil | do | 10.85 | 184 |
| 14 | 105 | 55 | 2 bentonite | do | 10.85 | 113 |
| 15 | 220 | | 10 Cab-O-Sil | | 10.75 | 151 |

¹ Cab-O-Sil is a colloidal amorphous silica manufactured by Godfrey L. Cabot, Inc.

In Table III it will be clear that the attainment of adequate one-day strength has been obtained with slurries 1 through 9, which contained colloidal amorphous silica and emulsified oil in the composition. Slurry 10, which contained only 0.5 gram of colloidal amorphous silica, had an inadequate one-day compressive strength. The data in Table III also show that 1, 2 or 3 grams of colloidal amorphous silica per 100 grams of cement, referring to slurries 1 to 9, and 11 to 13, produced slurries whose set strength has a high value. Bentonite and larger quantities of the colloidal amorphous silica do not give satisfactory results. The data further show that 2 grams of colloidal amorphous silica per 100 grams of cement are preferred.

Referring again to Table III, it will be seen that when large amounts of the silica were employed, referring to slurry 15, the one-day compressive strength was quite low. Further, referring to slurry 14, it will be seen that where bentonite, which is a colloidal clay-containing sodium montmorillonite, was used in the composition, an inadequate one-day compressive strength was obtained. From these data, it will be clear that where colloidal amorphous silica is employed in an amount in the range from 1 to about 3 grams per 100 grams of cement, a composition which has desirable qualities for use in cementing wells, such as oil and gas wells, is provided.

In making up the composition of the present invention, the oil-in-water emulsion is formed by mechanical agitation with the addition of about 50 to 65 milliliters of oil per 100 grams of cement having a specific gravity preferably of about 0.8. This is added to 95 to 110 milliliters (per 100 grams of cement) of water containing an emulsifying agent, which may be of a nonionic or anionic type. Specifically, calcium lignosulfonate is an anionic emulsifier which has been successfully used in the practice of the present invention. Nonionic agents which may be used include Renex-30, which is a polyoxyethylene alkyl ether and OPE-30, an octyl phenol 30 ethylene oxide. It may be desirable in the practice of the present invention, rather than using a single emulsifying agent, to employ two emulsifying agents with one of the emulsifying agents being added to the water and the other to the oil. For example, OPE-30, which is octyl phenol 30 ethylene oxide, may be used in the water and OPE-3, an octyl phenol 3 ethylene oxide, may be used in the hydrocarbon. Another acceptable two-agent composition is one in which Renex-30 functions as a principal emulsifier and calcium lignosulfonate functions as emulsifier and cement set retarder.

The concentration of the emulsifying agents employed may suitably range from about 0.25 to about 5.0 grams per 100 grams of cement. To the oil-in-water emulsion is added with mechanical agitation a dry blend containing from about 1 to about 3 grams of fine, colloidal amorphous silica and 100 grams of cement. Essential properties of this material include nonwater impurities less than 5% with the silicon oxide content of the dried material being 95% or above and particle size preferably in the range from about 0.015 to about 0.025 micron. The silica is then blended preferably into normal Portland cement of API Class A.

The cementing composition of the present invention may suitably be pumped into wells for use as a primary cement in the annulus between the wall of a borehole and the outer wall of a casing. The cement of the present invention may also be used in remedial work such as cementing of perforations and cementing of channels back of the casing. In employing the cementing composition of the present invention in workover operations, the cement slurry may suitably be pumped down into or placed in the casing and forced out through perforations to form a seal such that the casing may be reperforated in another zone or in the same zone, which may be hydrocarbon bearing, as desired.

The present invention is quite advantageous and useful in that there has been provided a superior low-density cement slurry which has unexpected properties due to the presence of the oil and the colloidal amorphous silica in the composition. A great advantage of the present invention is that the early strength development reduces the time usually required with conventional cements to set to a sufficient strength. Reductions in time allowed in using the present invention saves considerable time in rig costs.

The nature and objects of the present invention having been completely described and illustrated, what I wish to claim as new and useful and secure by Letters Patent is:

1. A low density, high early strength cementing composition consisting essentially of an oil-in-water emulsion, colloidal amorphous silica having a particle size within the range from about 0.005 to about 0.025 micron and hydraulic cement, said colloidal amorphous silica being present in an amount from about 1 to about 3 grams per 100 grams of said cement.

2. A low density, high early strength cementing composition consisting essentially of an oil-in-water emulsion, colloidal amorphous silica having a particle size within the range from about 0.005 to about 0.025 micron and Portland cement, said colloidal amorphous silica being present in an amount from about 1 to about 3 grams per 100 grams of said cement.

3. A low density, high early strength cementing composition consisting essentially of an oil-in-water emulsion, colloidal amorphous silica having a particle size within the range from about 0.005 to about 0.025 micron and hydraulic cement, said colloidal amorphous silica being present in an amount from about 1 to about 3 grams per 100 grams of said cement and said oil and water being present, respectively, in amounts within the ranges from about 50 to about 100 ml. and from about 95 to about 110 ml. per 100 grams of said cement.

4. A low density, high early strength cementing composition consisting essentially of an emulsion of oil and water containing an emulsifying agent, colloidal amorphous silica having a particle size within the range from about 0.005 to about 0.025 micron and hydraulic cement, said colloidal amorphous silica being present in an amount from about 1 to about 3 grams per 100 grams of said cement.

5. A low density, high early strength cementing composition consisting essentially of an emulsion of oil and water, colloidal amorphous silica having a particle size within the range from about 0.005 to about 0.025 micron and hydraulic cement, said colloidal amorphous silica being present in an amount from about 1 to about 3 grams per 100 grams of said cement.

6. A low density, high early strength cementing composition consisting essentially of an oil-in-water emulsion containing an emulsifying agent, colloidal amorphous silica having a particle size within the range from about 0.005 to about 0.025 micron and hydraulic cement, said colloidal amorphous silica being present in an amount from about 1 to about 3 grams per 100 grams of said cement.

7. A composition in accordance with claim 6 in which the oil has a specific gravity within the range from about 0.65 to about 0.95.

8. A composition in accordance with claim 6 in which the emulsifying agent is present in an amount within the range from about 0.25 to about 5.0 grams per 100 grams of cement.

9. A composition in accordance with claim 6 in which the emulsifying agent is a water soluble salt of lignin sulfonic acid.

10. A low density, high early strength cementing composition consisting essentially of an oil-in-water emulsion containing an emulsifying agent, colloidal amorphous silica having a particle size within the range from about 0.015 to about 0.025 micron and Portland cement, said colloidal amorphous silica being present in an amount from about 1 to about 3 grams per 100 grams of said cement and said oil and water being present, respectively, in amounts within the ranges from about 50 to about 100 ml. and from about 95 to about 110 ml. per 100 grams of said cement.

References Cited in the file of this patent

UNITED STATES PATENTS

| | | |
|---|---|---|
| 2,410,954 | Sharp | Nov. 12, 1946 |
| 2,798,003 | Morgan et al. | July 2, 1957 |
| 2,801,931 | Morgan et al. | Aug. 6, 1957 |
| 2,840,483 | Morgan et al. | June 24, 1958 |
| 2,842,449 | Bearden et al. | July 8, 1958 |

OTHER REFERENCES

White: "Vapor-Phase Production of Colloidal Silica," I. and E.C., volume 51, March 1959 (pages 232–238).